United States Patent [19]

Nomura et al.

[11] Patent Number: 5,928,586
[45] Date of Patent: Jul. 27, 1999

[54] MELT EXTRUSION PROCESSING METHOD OF THERMOPLASTIC RESIN

[75] Inventors: Hideo Nomura, Chiba; Mituo Maeda, Ibaraki, both of Japan

[73] Assignee: Sumitomo Chemical Co., Ltd., Osaka, Japan

[21] Appl. No.: 08/953,215

[22] Filed: Oct. 17, 1997

[30] Foreign Application Priority Data

Oct. 17, 1996 [JP] Japan .................................. 8-274800

[51] Int. Cl.$^6$ ........................... B29C 47/60; B29C 47/76
[52] U.S. Cl. ....................... 264/102; 264/211.21; 264/349
[58] Field of Search ............................. 264/102, 211.21, 264/349

[56] References Cited

U.S. PATENT DOCUMENTS 5,552,096  9/1996  Auda et al. ......................... 264/102 X

*Primary Examiner*—Leo B. Tentoni
*Attorney, Agent, or Firm*—Birch, Stewart, Kolasch & Birch, LLP

[57] ABSTRACT

A melt extrusion processing method of a thermoplastic resin, wherein a thermoplastic resin having a flow temperature of 200° C. or higher is subjected to extrusion processing using a melt kneading type extruder in which a vent port is provided at a downstream position by length L from the most upper stream portion of a melt kneading type extruder screw and L/D is from 4 to 18 (wherein D indicates the screw diameter and D and L are in the same scale unit), while continuously sucking from the said vent port at a reduced pressure of lower then 660 mmHg.

The invention provides a method which causes little resin degradation in an extruder to give an extruded article containing small amounts of discolored and degraded materials even when the processing is conducted for a relatively long time.

4 Claims, No Drawings

MELT EXTRUSION PROCESSING METHOD OF THERMOPLASTIC RESIN

BACKGROUND OF THE INVENTION

1. Field of the Invention

The present invention relates to a melt extrusion processing method of a thermoplastic resin having a high flow temperature. According to the present invention, even when extrusion processing is conducted continuously for relatively long period of time, there is obtained an extruded article which has not been degraded in an extruder and contains small amount of discolored and degraded materials.

2. Description of the Related Art

Thermoplastic engineering plastics are widely used in electric appliances and electronic parts, OA and AV parts, automobile parts and the like in virtue of their excellent heat resistance and mechanical properties.

These articles are produced from raw material pellets by various molding methods, and it is general to conduct extrusion-processing using a melt kneading type extruder in production of the above-described raw material pellets and in article production from these pellets. Since the thermoplastic resin is exposed to high temperature in an extruder, a part of the resin sometimes remains in the extruder and is degraded with a lapse of extrusion processing time and the resin remained and degraded in the extruder is sometimes contained in an extruded article resulting as a discolored and degraded material to cause disadvantages.

SUMMARY OF THE INVENTION

The object of the present invention is to provide a melt extrusion processing method of a thermoplastic resin which solves the above-described problems, that is causing little resin degradation in an extruder and providing an extruded article containing small amount of discolored and degraded materials even when the processing is conducted for a relatively long time.

The present inventors have intensively studied to solve the above problems, and as a result, have found that the extrusion processing of a thermoplastic resin having a specific flow temperature. Using a melt kneading type extruder with a vent port at a specific place of the melt kneading type extruder which is continuously sucking from the vent port at a specific reduced pressure can solve the above-mentioned problems, and completed the present invention.

Namely, the present inventions are as follows.

(1) A melt extrusion processing method of a thermoplastic resin, wherein a thermoplastic resin having a flow temperature as defined below of 200° C. or higher is subjected to extrusion-processing using a melt kneading type extruder in which a vent port is provided at a down stream position by length L from the most upper stream portion of the melt kneading type extruder screw where L/D is from 4 to 18 (wherein, D indicates screw diameter where D and L are in the same scale unit), with continuously sucking from the said vent port at a reduced pressure of lower than 660 mmHg:
the flow temperature: temperature at which melt viscosity is 48000 poise when a heat-molten material is extruded from a nozzle at a temperature rising rate of 4° C./minute under a load of 100 kg/cm² using a capillary rheometer which comprises a nozzle having an inner diameter of 1 mm and a length of 10 mm.

(2) The melt extrusion processing method of a thermoplastic resin according to (1), wherein the flow temperature of the thermoplastic resin is 250° C. or higher.

(3) The melt extrusion processing method of a thermoplastic resin according to (1) or (2), wherein the thermoplastic resin is a liquid crystal polyester.

(4) The melt extrusion processing method of a thermoplastic resin according to (1) or (2), wherein the thermoplastic resin is a liquid crystal polyester containing a repeating structural unit represented by the following formula $A_1$ in an amount of at least 30% by mol based on the total amount.

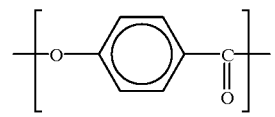

(A1)

(5) An article obtained by the melt extrusion processing method according to (1), (2), (3) or (4).

DETAILED DESCRIPTION OF THE INVENTION

The thermoplastic resin used in the present invention having a flow temperature of 200° C. or higher is not particularly limited, and for example, a polyamide, polycarbonate, polyphenylene sulfide, polyetherimide, polysulfone, polyether sulfone, polyether ketones, polyether nitrile and liquid crystal polyester can be exemplified. In particular, the liquid crystal polyester tends to remain in an extruder, since it is a resin of which melt viscosity has high temperature dependency and high shear rate dependency, and the effect of the present invention is realized much effectively.

The liquid crystal polyester used in the present invention is a polyester called thermotropic liquid crystal polymer, and examples thereof include;

(1) a polyester of a combination of an aromatic dicarboxylic acid, aromatic diol and aromatic hydroxycarboxylic acid, (2) a polyester of a combination of different kinds of aromatic hydroxycarboxylic acids, (3) a polyester of a combination of an aromatic dicarboxylic acid and aromatic diol, (4) a polyester obtained by reacting an aromatic hydroxycarboxylic acid with a polyester such as polyethylene terephthalate, and the like. And, each of them forms an anisotropic molten material at a temperature of not higher than 400° C. In place of these aromatic dicarboxylic acid, aromatic diol and aromatic hydroxycarboxylic acid, ester-forming derivatives thereof are also sometimes used.

Examples of the repeating structural unit of the above-described liquid crystal polyester include, but not limited to, the following units.

Repeating structural units derived from aromatic hydroxycarboxylic acids:

(A1)
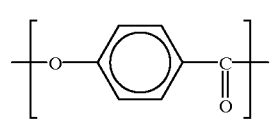
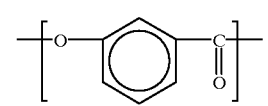
(X1: halogen, alkyl)
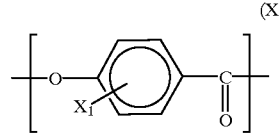
(A2)
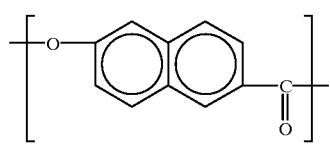
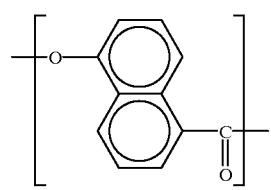
Repeating structural units derived from aromatic dicarboxylic acids:
(B1)
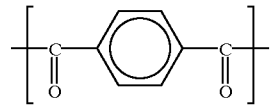
(B2)
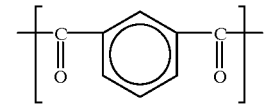
(X2: halogen, alkyl, aryl)
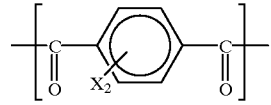
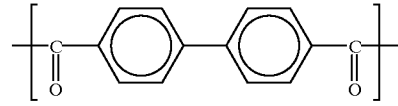
(B3)
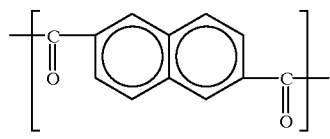
-continued
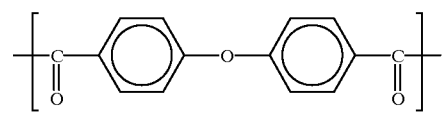
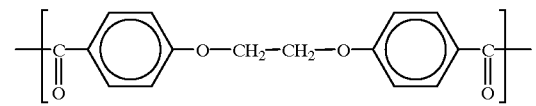
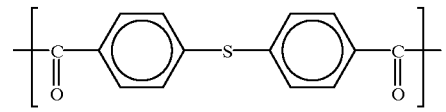
Repeating structural units derived from aromatic diols:
(C1)
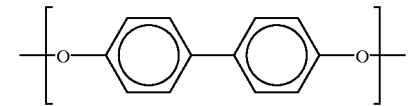
(C2)
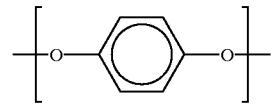
(C3)
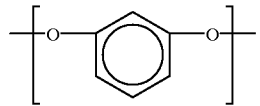
(X2: halogen, alkyl, aryl)
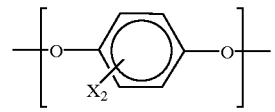
(X3: H, halogen, alkyl)
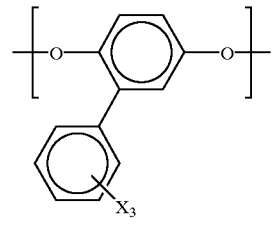

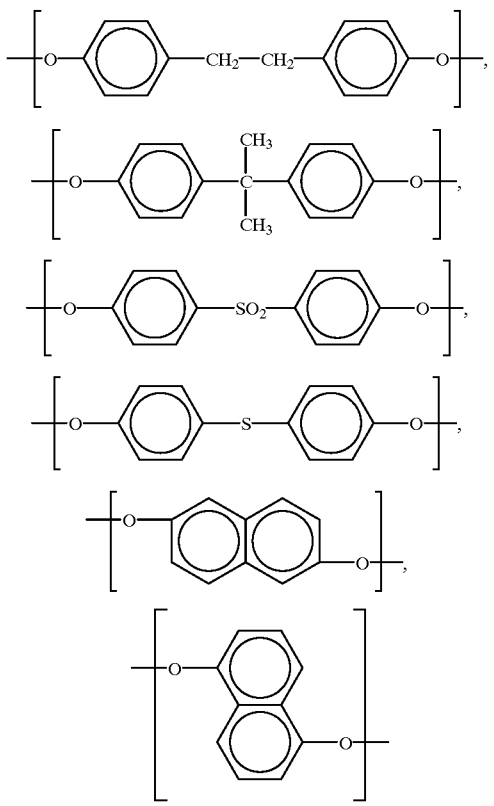

A liquid crystal polyester which is particularly preferable in view of a balance between heat resistance, mechanical properties and processability is one which comprises the repeating structural unit represented by ($A_1$) in an amount of at least 30% by mol.

Concretely, liquid crystal polyesters containing repeating structural units in combination represented by the following formulae (a) to (f) are preferable.

(a):($A_1$), ($B_1$) or a mixture of ($B_1$) and ($B_2$), ($C_1$).

(b): ($A_1$), ($A_2$)

(c):Combination (a) wherein a part of ($A_1$) is replaced by ($A_2$).

(d):Combination (a) wherein a part of ($B_1$) is replaced by ($B_3$)

(e):Combination (a) wherein a part of ($C_1$) is replaced by ($C_3$).

(f):Combination (b) to which structural units ($B_1$) and ($C_1$) are further added.

The liquid crystal polyesters having the basic structures (a) and (b) are described respectively in JP-B-47-47870 and JP-B-63-3888.

In the present invention, a filler can be optionally added to the thermoplastic resin. Examples of the filler include fibrous or needle form reinforcing materials such as glass fiber, silica alumina fiber, wolastnite, carbon fiber, potassium titanate whisker, aluminum borate whisker, titanium oxide whisker and the like; inorganic fillers such as potassium carbonate, dolomite, talc, mica, clay, glass bead and the like; and these can be used alone or in combination of two or more.

Further, to the thermoplastic resin used in the present invention, there can be added one or more usual additives such as coloring agents like dyes and pigments; antioxidants; heat stabilizers; ultraviolet absorbers; antistatic agents; surfactants, within the range which does not lose the object of the present invention.

When a liquid crystal polyester is used as a thermoplastic resin having a flow temperature of 200° C. or higher in the present invention, there can also be added one or more of a small amount of other thermoplastic resins, for example, polyamide, polyester, polyphenylene sulfide, polyether ketone, polycarbonate, polyphenylene ether and modified compounds thereof, polysulfone, polyether sulfone, polyether imide and the like, and a small amount of thermosetting resin, for example, phenol resin, epoxy resin, polyimide resin and the like.

The extrusion processing method using a melt kneading extruder in the present invention is applied to a granulating process of a thermoplastic resin, an extruding process of a film and a pipe, a blow molding process and the like, but it is not limited to these.

The melt kneading type extruder used in the present invention is not particularly limited so long as it is a melt kneading extruder, and those having a monoaxial screw or a biaxial screw rotating to the same or different directions are commonly used.

The melt kneading type extruder used in the present invention is one in which a vent port is provided at a down stream position by a length of L from the most upper stream portion of a melt kneading type extruder screw and L/D is from 4 to 18, preferably from 5 to 15. It is not preferable that L/D is more than 18, since a resin tends to be degraded by oxidation due to blown air through a raw material feeding port in melt extrusion processing. On the other hand, it is not preferable that L/D is less than 4, since a raw material resin which has not been molten sufficiently is sucked through the vent port in melt extrusion processing.

The reduced pressure at the vent port in melt extrusion processing is lower than 660 mmHg, preferably lower than 560 mmHg and more preferably from 300 to 10 mmHg. In the present invention, a method for generating reduced pressure at the vent port is not particularly limited, and for example, methods for generating a reduced pressure using a rotary pump, oil diffusion pump, turbo pump and the like are exemplified.

The cylinder temperature in the melt extrusion processing is depend on a thermoplastic resin to be used and not limited especially. However, it is usually from the flow temperature of the thermoplastic resin to 120° C. above the flow temperature, preferably from the flow temperature of the thermoplastic resin to 100° C. above the flow temperature and more preferably from the flow temperature of the thermoplastic resin to 80° C. above the flow temperature.

The article produced by the processing method of the present invention contains very little discolored degraded material, therefore, it can be suitably applied for use in which appearance is important such as an exterior package part and the like.

EXAMPLES

The following example further illustrates the present invention in detail but is not to be construed to limit the scope thereof. The measurement of black foreign materials in a molded article shown in the example was conducted according to the following procedure.

(1) The cylinder, screw and nozzle of PS40E5ASE (trade name) of a melt kneading type extruder manufactured by Nissei Resin Industry K.K. are disassembled and fully cleaned.

(2) Twenty molded articles of 64 mm×64 mm×3 mm are made using PS40E5ASE.

(3) The above-described molded article is placed on a fluorescent light box, and the total number of foreign materials having an average particle size of 150 μm or more contained in the molded article was counted by transmission light thereof. Here, the number of the foreign materials having an average particle size of 150 μm or more was counted by comparison with the limit sample thereof.

(4) The number counted in (3) was calculated in terms of the molded article 100 g.

Example 1

To 60% by weight of a liquid crystal polyester in which the above-described $A_1$, $B_1$, $B_2$ and $C_1$ are contained as repeating structural units and the molar ratio of $A_1$: $B_1$: $B_2$: $C_1$ is 60:18:2:20, and the flow temperature determined by the above-described method is 353° C. was added 40% by weight of Mild glass fiber (manufactured by Central Glass K.K., trade name:EFH75-01) and they were mixed by a Henschel mixer. A biaxial extruder (manufactured by IKG K.K., trade name: PCT-47) of which screw and cylinder had been previously disassembled and cleaned was assembled, in which a vent port was provided at a position where the above-prescribed L/D was 10 based on the most upper stream portion of the extruder screw. Sucking from the vent port at a reduced pressure of 260 mmHg, the mixture was granulated continuously at a cylinder temperature of 380° C. to obtain a liquid crystal polyester resin composition pellet. After 1 ton of the pellet of this composition was produced, the biaxial extruder was disassembled to find no stain in both the screw and the cylinder. Further, foreign material level was measured regarding an article molded from the pellet produced in the above continuous granulation of 1 ton. The number of foreign materials having an average particle size of 150 μm or more was 7/100 g. This indicates that the foreign material mixed level in the liquid crystal polyester resin composition produced by the method of the present invention is extremely low.

Comparative Example 1

An experiment was conducted in the same manner as in Example 1 except that a vent port was provided at a position where the above-prescribed L/D was 20 based on the most upper stream portion of the extruder screw, and granulation was continuously conducted with the vent port being continuously sucked at a reduced pressure of 500 mmHg. After 1 ton of the pellet of the liquid crystal polyester resin composition was continuously produced, the biaxial extruder was disassembled to find no black discoloration at upper stream portion of the screw. Further, foreign material level was measured regarding a molded article obtained from the pellet when continuous granulation was carried out to obtain 1 ton of the product. Then, the number of foreign materials having an average particle size of 150 μm or more was 81/100 g. This indicates that foreign material mixed level in the molded article obtained from the pellet of Comparative Example 1 was extremely higher than the molded article obtained from the pellet of Example 1.

According to the melt extrusion processing method of a thermoplastic resin of the present invention, there is obtained an extrusion molded article which is not so much degraded in an extruder and contains little discolored degraded materials even when extrusion processing is continued for relatively long time. The article is a material suitable for thin layer electric appliance parts and electronic parts since it contains little foreign degraded materials.

What is claimed is:

1. A method for processing a thermoplastic resin by melt extrusion which comprises subjecting a thermoplastic resin having a flow temperature as defined below of 200° C. or higher to extrusion-processing using a melt kneading type extruder in which a vent port is provided at a downstream position by length L from the most upper stream portion of a melt kneading type extruder screw where L/D is from 4 to 18 wherein D indicates the screw diameter when D and L are in the same scale unit, while continuously sucking from the said vent port at a reduced pressure of lower than 660 mmHg, said flow temperature being the temperature at which the melt viscosity is 48000 poise when a heat-molten material is extruded from a nozzle at a temperature rising rate of 4° C./minute under a load of 100 kg/cm² using a capillary rheometer which comprises a nozzle having an inner diameter of 1 mm and a length of 10 mm.

2. The method according to claim 1, wherein the flow temperature of the thermoplastic resin is 250° C. or higher.

3. The method according to claim 1 or 2, wherein the thermoplastic resin is a liquid crystalline polyester.

4. The method according to claim 1 or 2, wherein the thermoplastic resin is a liquid crystalline polyester containing a repeating structural unit represented by the following formula $A_1$ in an amount of at least 30% by mol based on the total amount

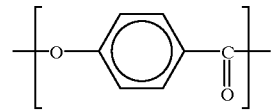

(A1)

* * * * *